Jan. 23, 1951  I. DEMPSTER  2,539,232
CUTTING DEVICE WHEREIN KNIFE HAS COMPOUND MOVEMENT
Filed Oct. 9, 1945  3 Sheets-Sheet 1
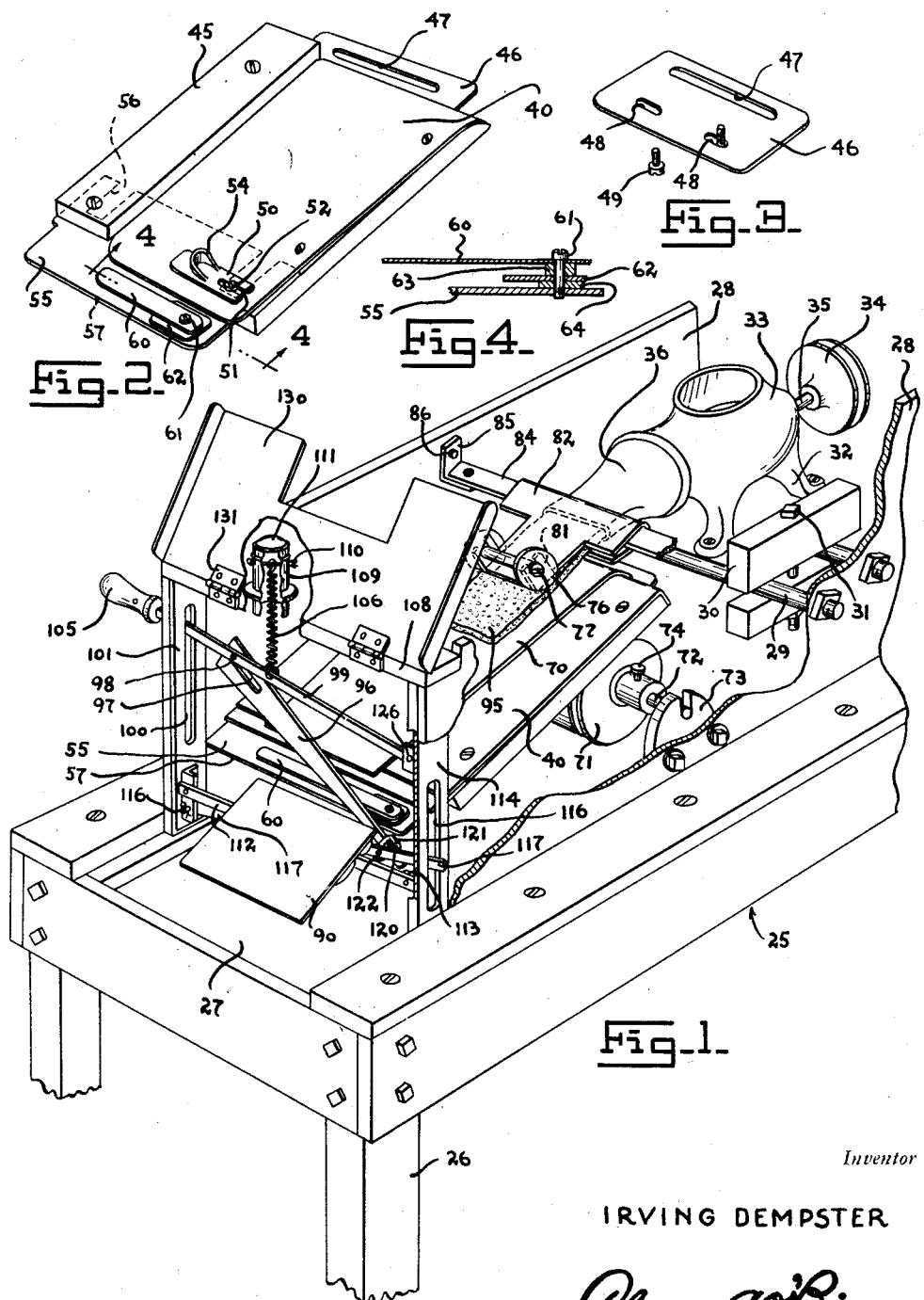
Inventor
IRVING DEMPSTER
By *Clarence A. O'Brien and Harvey B. Jacobson*
Attorneys

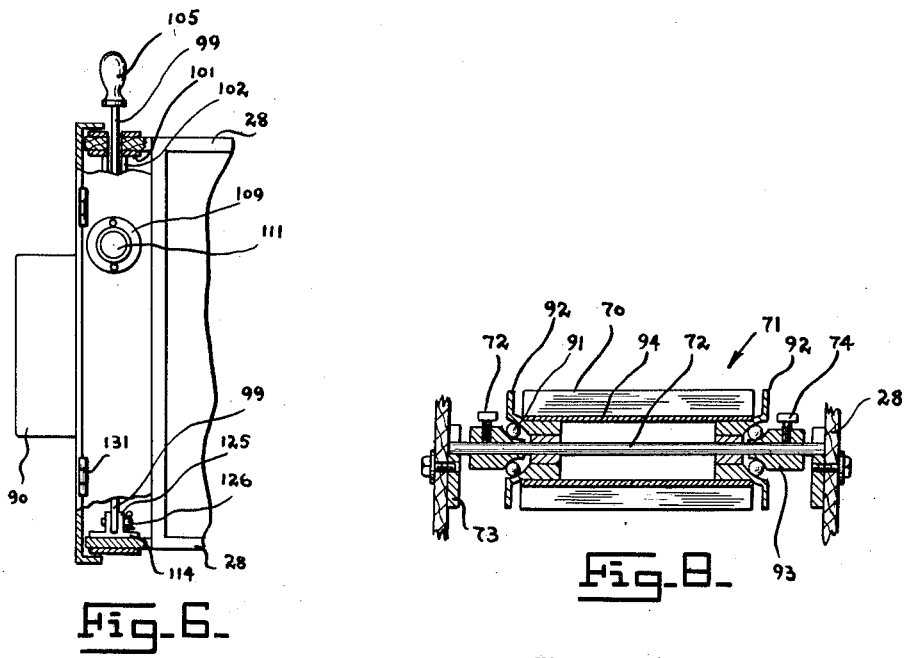
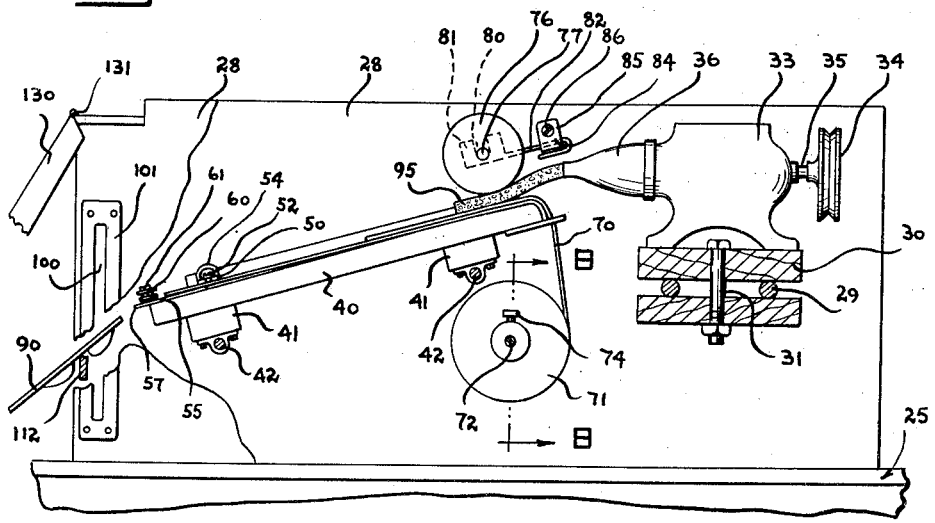

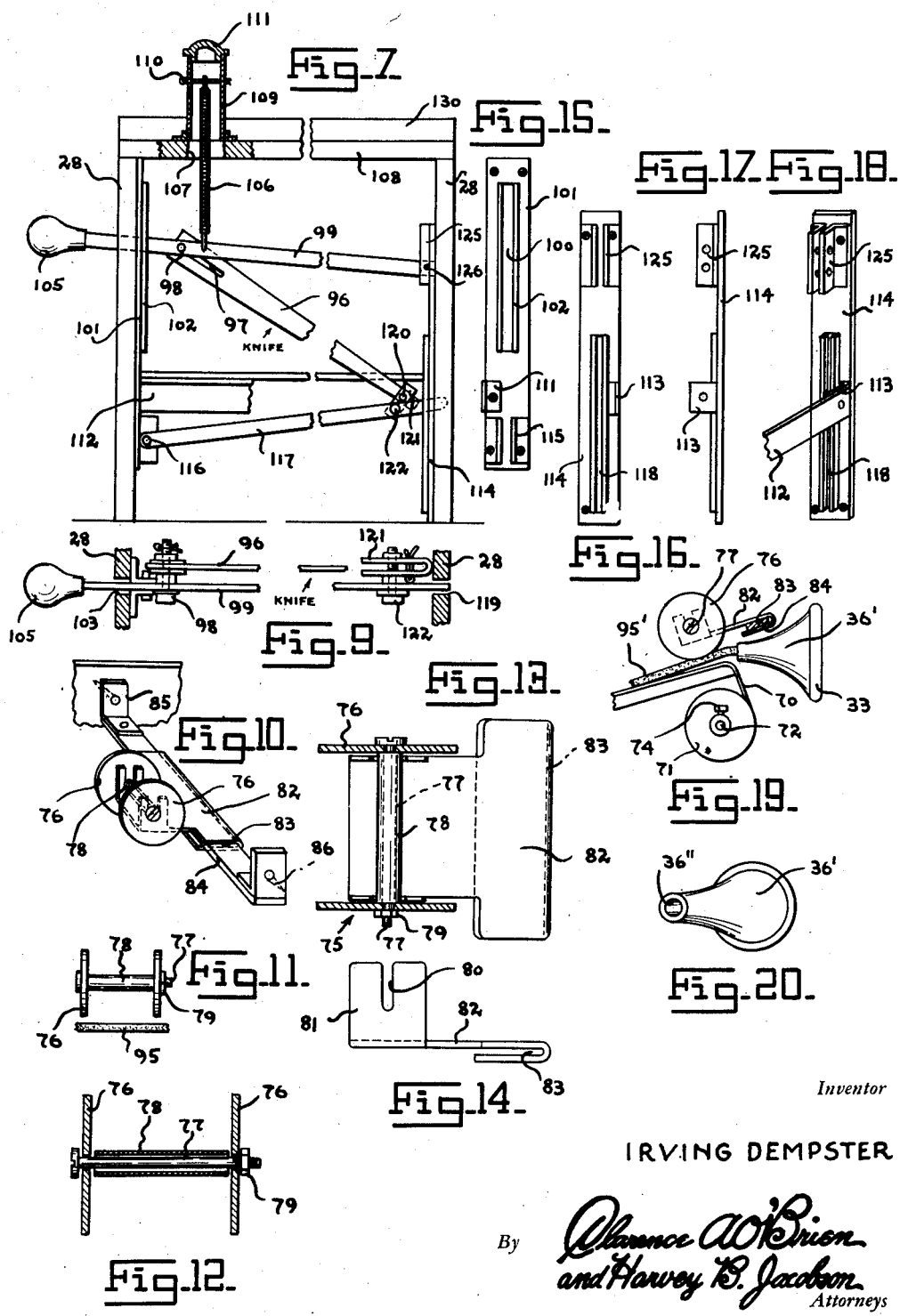

Patented Jan. 23, 1951

2,539,232

UNITED STATES PATENT OFFICE 2,539,232

CUTTING DEVICE WHEREIN KNIFE HAS COMPOUND MOVEMENT

Irving Dempster, Fort Plain, N. Y.

Application October 9, 1945, Serial No. 621,290

3 Claims. (Cl. 146—131)

This invention relates to a food stock forming machine, and more particularly to such a machine adapted for the forming of food stuffs, such as hamburger, chopped meat products of all kinds, and similar semi-pasty substances into ribbon-like form.

A primary object of this invention is the formation of food stuff, such as hamburger or the like, into pre-shaped patties of a desired configuration and shape, whereby the same may be readily formed into sandwiches or the like.

An additional object of the invention is the formation of such patties previously disposed on a suitable paper backing and cutting the food stuff and the paper simultaneously to a desired size.

An important feature of this invention is the provision of a device adapted for the formation, kneading and cutting of food stuffs such as hamburger into ribbon-like strips of a predetermined and desired length.

A further important feature of the invention is the provision of such a structure adapted for the speeding up of the formation of such strips or patties, whereby the quantity of sandwiches, or the like, made by the operator may be substantially increased.

Still another feature of the invention resides in the provision of such a device which will be sturdy and durable in construction, reliable and efficient in operation and relatively simple and inexpensive to manufacture, assemble, and operate.

Other objects reside in the combinations of elements, arrangements of parts and features of construction, all as will be more fully pointed out hereinafter and disclosed in the accompanying drawings, wherein there is shown a preferred embodiment of this inventive concept.

In the drawings:

Figure 1 is a perspective view, partially broken away, disclosing a preferred embodiment of this inventive concept, Figure 2 is a perspective view of a constructional detail, Figure 3 is a perspective view of one of the elements shown in Figure 2, Figure 4 is a sectional view taken substantially on the line 4—4 of Figure 2 as viewed in the direction indicated by the arrows, Figure 5 is a side elevational view, certain parts thereof being broken away and certain parts thereof being shown in section, of the device shown in Figure 1, Figure 6 is a fragmentary top plan view of one end of the construction shown in Figure 5, certain parts thereof being broken away, Figure 7 is an end view, partially in elevation and partially in section, of the construction shown in Figure 5, as viewed from the left, Figure 8 is a sectional view taken substantially along the line 8—8 of Figure 5, as viewed in the direction indicated by the arrows, Figure 9 is a fragmentary view, partially in elevation and partially in section, disclosing certain of the operating elements shown in Figure 7, Figure 10 is a perspective view, partially broken away, of a constructional detail, certain of the elements thereof being indicated in dotted lines, Figure 11 is an elevational view of a detail of construction shown in Figure 10, Figure 12 is an enlarged longitudinal sectional view of one of the elements shown in Figure 11, Figure 13 is a top plan view of the constructional detail shown in Figures 11 and 12, Figure 14 is a side elevational view of the mounting means disclosed in Figure 13, Figure 15 is a plan view of one of the mounting brackets shown in Figure 7, Figure 16 is a plan view of the mounting bracket on the opposite side of the device, Figure 17 is a side view of the bracket shown in Figure 16, Figure 18 is a perspective view of the brackets shown in Figures 16 and 17 showing the means of connecting certain associated mechanism thereto, Figure 19 is a fragmentary view, partially in elevation and partially in section, of a modified form of construction, and Figure 20 is a top plan view of a detail of construction shown in Figure 19.

Similar reference characters refer to similar parts throughout the several views of the drawings.

Having reference now to the drawings, and more particularly to Figure 1, there is generally indicated at 25 a supporting frame, including legs 26, and a supporting table-like surface 27. The surface 27 carries side walls 28, between which extend supporting rods 29 carrying blocks 30, to which is secured, as by suitable bolts 31, a base 32 for a meat grinder and/or compressor or the like, 33 of any desired conventional type, adapted to be driven in any suitable manner, as by a drive belt connected to a pulley 34 mounted on the drive shaft 35 of the grinder and/or compressor and driven from any suitable source of power, such as an electric motor (not shown). The grinder 33 is provided with a discharge nozzle 36, terminating in a discharge opening in the form of an elongated slot horizontal to the base 27 of the device.

The meat leaving the nozzle 36 is fed onto an angularly inclined table 40 carried by supporting blocks 41, mounted on shafts 42 extending between the side walls 28. As best shown in Figure 2, the table 40 includes a guide block 45 for the food stuffs, and is provided at one end with a paper guide 46, comprising a plate having an elongated slot 47 therein, through which paper is fed, in a manner to be more fully described hereinafter, and a pair of slots 48 through which screws 49 are passed to secure the plate to the base of the table 40, the slots being provided to permit lateral adjustment of the plate, and correspondingly the slot 47, to center the paper directly in alignment with the discharge nozzle 36. The plate 40 also carries an additional guide 50, provided with a slot 51 through which a screw 52 passes to hold the same adjustably to the upper surface of the table 40 adjacent the lower extremity thereof, the guide 50 being provided with an arcuate upstanding lug 54 to bear against the edge of the paper supporting the food stuffs. Obviously, the guide may be relatively positioned to accommodate a desired width of paper carrying the food stuffs as fed from the nozzle.

A table knife 55, or fixed cutting blade, is adapted to be secured to the lower side of the table 40, as by means of screws engaging suitable longitudinally extending slots 56 in such manner that the cutting edge 57 may be adjustably positioned with respect to the table 40. As best shown in Figure 4, the plate 55 carries a food guide 60, mounted on a screw 61 secured in the plate 55, and suitably spaced therefrom as by a guide plate 62 and spacing washers 63 and 64. This guide 60 is for the purpose of preventing food stuff from piling up on the rear edge of a movable knife, to be more fully described hereinafter, coacting with the fixed knife surface 57 of the plate 55.

Paper 70 is adapted to be carried on a roll 71 mounted on an axle 72 suitably journaled in slotted lugs 73 secured between the side walls 28 and beneath the table 40. The position of the roll is adjustable laterally on the shaft 72, as by means of a set-screw 74.

A guide roll, generally indicated at 75, and comprised of two end disks 76 is mounted for rotation on a shaft 77 and spaced apart as by a tubular sleeve 78. A nut 79 engaging the threaded end of bolt 77 serves to hold the parts in related assembly. The guide roller is mounted in vertically extending slots 80 in upwardly extending lugs 81 carried by a plate 82 bent at its extremity to form a channel 83 (see Fig. 14), which channel is adapted to be positioned slidably about a transverse flattened bar 84 having upwardly turned extremities 85 and adapted to be secured, as by means of screws 86, between the side walls 28. Thus it will be seen that the guide roller assembly is movable transversely between the side walls 28 for proper adjustment relative to the nozzle 36.

From the foregoing, it will now be seen that as the meat leaves the nozzle 36, the paper 70 having previously been passed through the slot 47 and over the upper surface of the table 40, that the meat sticks to the paper, being held thereon by the relatively light pressure of the disks 76, and as the meat is ejected from the nozzle 36, it is carried by gravity along the inclined table 40, carrying the paper with it, between the guide blocks 45 and the guide 54, and under the guide plate 60 to the knife edge 57 of the plate 55. From this point, the meat or other food stuff passes over an inclined plate 90 onto the table surface 27, suitably positioned on top of the paper 70. The food stuff is adapted to be cut into desired lengths adjacent the knife edge 57 of the plate 55 in a manner to be more fully described hereinafter.

Relatively free movement of the paper 70 is provided by mounting the roller 71 in ball bearings 91, positioned in channels between end plates 92 and collars 93 in which the set-screws 74 are positioned, (see Fig. 8). It is to be noted that a sleeve 94 surrounds collars 95 mounted on the shaft 72 and that the paper 70 is positioned around the sleeve 94, thus insuring relatively free feeding of the paper 70 when engaged by the food stuff, the latter being indicated at 95.

Referring now to the movable knife, the means for cutting the food stuff to a desired length, it will be seen, as best shown in Figure 7, that the knife comprises a cutting blade 96 provided, at its extremity, with a slot 97 within which a pivot 98 is adapted to move. The pivot 98 is carried by a lever 99 which extends through a suitable slot 100 in a bracket 101 mounted on one of the side walls 28. The sides of the slot are provided with guide flanges 102, and the slot 100 is aligned with a slot 103 extending through the walls 28. The lever 99 terminates in an operating handle 105.

A coil spring 106 is suitably secured to the lever 99 at a point adjacent pivot 98 but spaced therefrom toward pivot 126 the spring extends upwardly through an aperture 107 in a top bar 108 extending across the top of the side walls 28 into a cylindrical housing 109, being secured therein, as by means of a cotter pin 110. A suitable cover 111 is provided for the top of the cylindrical housing 109.

As best shown in Figures 7 and 15, the plate 101 carries, at an intermediate point, a lug 111, to which is secured one end of a transverse bar 112, the other end of which is secured to a corresponding lug 113, carried by a plate 114 oppositely positioned on the opposite side wall 28 with respect to the plate 101. The supporting bar 112 is adapted to carry the upper extremity of the guide plate 90. The lower end of the plate 101 carries a pair of spaced lugs 115 between which is secured, as by means of a pivot 116, the end of a lever 117, the opposite end of which extends outwardly through a slot 118 in plate 114 and through a corresponding slot 119 in the side wall 28. The end of the knife 96 opposite the pivot 98 is pivotally secured, as by a pivot 120, in a bracket 121 pivotally mounted on a pivot 122 secured to the lever 117 at a point relatively closely adjacent the slot 118 through which its extremity passes. The opposite end of the lever 99 is pivotally secured between lugs 125 carried by the upper extremity of plate 114. From the foregoing, it will now be seen that when the handle 105 is pressed downwardly, the lever 99 swings about its pivot 126 between lugs 125 and, through the pivot 98, causes the knife blade to swing downwardly in an arc. Simultaneously, as the knife reaches the lower extremity of this arc, the lever 117 is caused to swing about an arc about the pivot 116, thus effectively lowering the knife 96 well below the cutting edge 57 of the plate 55 and effectively severing both the meat product 95 and its associated paper 70.

A modified form of construction is disclosed in Figures 19 and 20 wherein a nozzle 36' is disclosed with a cylindrical opening 36'' instead of the elongated slot of the nozzle 36 and is adapted to feed food stuffs 95' in roll form for various usages.

From the foregoing, it will now be seen that there is herein provided an improved device for the shaping and cutting of food stuffs, in ribbon form, whereby the food stuff, such as hamburger, is fed from the mixer through a nozzle onto the table 40, overlying a strip of paper 70, and thence downwardly between the cutting blades 96 and 57 to be severed into any desired lengths, and of the requisite shape. It will also be seen that a plurality of adjustments are provided whereby the width of the food may be varied, and the paper relatively positioned so that the food stuff may be centered thereon, and correspondingly that the various guide means for the paper and food stuff may be satisfactorily aligned to provide a perfect patty of any desired relative length.

If desired, as best shown in Figure 1, the assembly may be provided with an end plate or cover 130 hinged, as by hinges 131, to the end plate 108.

From the foregoing, it will now be seen that there is herein provided a device accomplishing all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. For use with a food treating apparatus, a cutter mechanism comprising a fixed cutter, a frame supporting said fixed cutter, said frame having a first and a second slot in opposite first and second walls thereof, a lever pivoted to said first wall and passed through the slot in said second wall, a knife connected with said lever by a pin and slot connection at one end of said knife, the opposite end of said knife having a bracket pivotally secured thereto, a second lever pivoted to the second wall and having one end passed through the slot in said first wall, said bracket being secured pivotally to said second lever whereby upon movement of said first mentioned lever, said knife is pivoted about the pivotal connection between said bracket and said second lever and said second lever is pivotally operated with said knife.

2. For use with a food treating apparatus, a cutter mechanism comprising a fixed cutter, a frame supporting said fixed cutter, said frame having a first and a second slot in opposite first and second walls thereof, a lever pivoted to said first wall and passed through the slot in said second wall, a knife connected with said lever by a pin and slot connection at one end of said knife, the opposite end of said knife having a bracket pivotally secured thereto, a second lever pivoted to the second wall and having one end passed through the slot in said first wall, said bracket being secured pivotally to said second lever whereby upon movement of said first mentioned lever, said knife is pivoted about the pivotal connection between said bracket and said second lever and said second lever is pivotally operated with said knife, a spring secured to said frame and secured to said lever opposing the pivotal operation of said lever, and said fixed cutter being disposed at the end of a plate which is adapted to support the article to be cut.

3. In a foodstuff treating apparatus which includes a frame having spaced walls, a guide plate disposed between said spaced walls adapted to support the articles to be cut, said guide plate having a stationary cutter edge, a lever pivotally secured to one of said walls and a knife pivoted to said lever, a second lever pivoted to the other of said walls, means consisting of a link connecting said knife and said second lever, whereby pivotal operation of said first lever pivotally actuates said knife and said second lever which is disposed below the stationary cutter portion of said plate so that said second lever is displaced away from said plate when said knife is operated.

IRVING DEMPSTER.

REFERENCES CITED

The following references are of record in the file of this patent:

UNITED STATES PATENTS

| Number | Name | Date |
|---|---|---|
| 1,651,176 | Bannon | Nov. 29, 1927 |
| 1,675,563 | Klohe | July 3, 1928 |
| 1,926,245 | Schmitt | Sept. 12, 1933 |
| 2,085,108 | Louisot et al. | June 29, 1937 |
| 2,209,824 | Louisot et al. | July 30, 1940 |